(12) United States Patent
Dow et al.

(10) Patent No.: US 9,213,711 B2
(45) Date of Patent: *Dec. 15, 2015

(54) HARDWARE CONTIGUOUS MEMORY REGION TRACKING

(71) Applicant: International Business Machines Corporation, Armonk, NY (US)

(72) Inventors: Eli M. Dow, Norwood, NY (US); James P. Gilchrist, Poughkeepsie, NY (US); Steven K. Schmidt, Essex Junction, VT (US); Jessie Yu, Wappinger Falls, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/090,454

(22) Filed: Nov. 26, 2013

(65) Prior Publication Data

US 2014/0165059 A1    Jun. 12, 2014

Related U.S. Application Data

(63) Continuation of application No. 13/690,162, filed on Nov. 30, 2012.

(51) Int. Cl.
  *G06F 7/00*      (2006.01)
  *G06F 17/30*     (2006.01)
  *G06F 9/455*     (2006.01)

(52) U.S. Cl.
  CPC ...... *G06F 17/30097* (2013.01); *G06F 9/45558* (2013.01); *G06F 17/30076* (2013.01); *G06F 17/30156* (2013.01); *G06F 17/30233* (2013.01); *G06F 2009/4557* (2013.01)

(58) Field of Classification Search
  CPC ................... G06F 17/30076; G06F 17/30156; G06F 17/30233
  See application file for complete search history.

(56) References Cited

U.S. PATENT DOCUMENTS

| | | | |
|---|---|---|---|
| 6,075,938 A * | 6/2000 | Bugnion et al. | 703/27 |
| 6,778,977 B1 | 8/2004 | Avadhanam et al. | |
| 6,789,156 B1 | 9/2004 | Waldspurger | |
| 7,139,743 B2 | 11/2006 | Indeck et al. | |
| 7,484,208 B1 * | 1/2009 | Nelson | 718/1 |
| 8,074,047 B2 | 12/2011 | Abali et al. | |
| 8,108,353 B2 * | 1/2012 | Balachandran et al. | 707/664 |
| 8,407,193 B2 * | 3/2013 | Gruhl et al. | 707/693 |
| 8,495,108 B2 * | 7/2013 | Nagpal et al. | 707/822 |

(Continued)

OTHER PUBLICATIONS

Cheriton et al., HICAMP: Architectural Support for Efficient Concurrent-safe Shared Structured Data Access, ASPLOS '12, pp. 287-295, Mar. 2012, ACM and referred to hereinafter as Cheriton.*

(Continued)

*Primary Examiner* — Michael Hicks
(74) *Attorney, Agent, or Firm* — Cantor Colburn LLP; Steven Chiu

(57) ABSTRACT

Embodiments of the invention relate to performing a scan of a memory region associated with a virtual machine. The scan is performed by a hardware mechanism in response to a call. A data structure that includes information about substrings identified during the scan and a number of replications for each substring is constructed by the hardware mechanism. The data structure is stored by the hardware mechanism at a location determined by the call.

11 Claims, 5 Drawing Sheets

(56) References Cited

U.S. PATENT DOCUMENTS

2008/0189251 A1 8/2008 Branscome et al.
2009/0204718 A1 8/2009 Lawton et al.

OTHER PUBLICATIONS

Bentley et al., "Data compression with long repeated strings". Information Sciences 135, pp. 1-11, 2001, Elsevier Science Inc.*
Agarwal et al., "An approximation to the greedy algorithm for differential compression", IBM J. RES. & DEV., vol. 50, No. 1, 2006, IBM.*
Diwaker Gupta et al., "Difference engine: Harnessing memory redundancy in virtual machines," 8th USENIX Symposium on Operating System Design and Implementation, 2008, p. 1-14.
Prateek Sharma et al., "Singleton: System-wide Page Deduplication in Virtual Environments," HPDC'12, Jun. 18-22, 2012, Delft, The Netherlands, p. 1-12.
Carl A. Waldspurger, "Memory Resource Management in VMware ESX Server," Proceedings of the 5th Symposium on Operating Systems Design and Implementation, Boston, Massachusetts, USA Dec. 9-11, 2002, p. 1-15.
Peter Mell et al., "The NIST Definition of Cloud Computing," Version 15; p. 1-2; Oct. 7, 2009.

* cited by examiner

HARDWARE CONTIGUOUS MEMORY REGION TRACKING

CROSS-REFERENCE TO RELATED APPLICATION

This application is a continuation of U.S. patent application Ser. No. 13/690,162, filed Nov. 30, 2012, the disclosure of which is incorporated by reference herein in its entirety.

BACKGROUND

The present invention relates to management of virtual machines (VMs), and more specifically, to a method for balancing virtual machine loads between hardware platforms.

Providers of cloud computing have the competing tasks of providing desired performance for consumers or end users while also efficiently allocating the resources used to provide services to consumers. The resources may be dynamically allocated by the provider to help achieve these goals. Accordingly, a hardware platform may host a plurality of virtual machines, wherein each virtual machine corresponds to a consumer. Efficient use of the hardware platform resources dictates that the provider place as many virtual machines on the platform as possible without compromising the consumer's use of the virtual machine and experience. It may be desirable to move or migrate a virtual machine from one hardware platform to another to ensure that the customer is not adversely affected by changes in resource availability for the virtual machines.

SUMMARY

An embodiment is a method for performing a scan of a memory region associated with a virtual machine. The scan is performed by a hardware mechanism in response to a call. A data structure that includes information about substrings identified during the scan and a number of replications for each substring is constructed by the hardware mechanism. The data structure is stored by the hardware mechanism at a location determined by the call.

Another embodiment is an apparatus that includes at least one processor and a storage device. The storage device has instructions stored thereon that, when executed by the at least one processor, cause the apparatus to perform a scan of a memory region associated with a virtual machine. The scan is performed by a hardware mechanism in response to a call. A data structure that includes information about substrings identified during the scan and a number of replications for each substring is constructed by the hardware mechanism. The data structure is stored by the hardware mechanism at a location determined by the call.

A further embodiment is a computer program product that includes a computer readable storage medium having computer readable program code embodied therewith. The computer readable program code includes computer readable program code configured for performing a scan of a memory region associated with a virtual machine. The scan is performed by a hardware mechanism in response to a call. A data structure that includes information about substrings identified during the scan and a number of replications for each substring is constructed by the hardware mechanism. The data structure is stored by the hardware mechanism at a location determined by the call.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
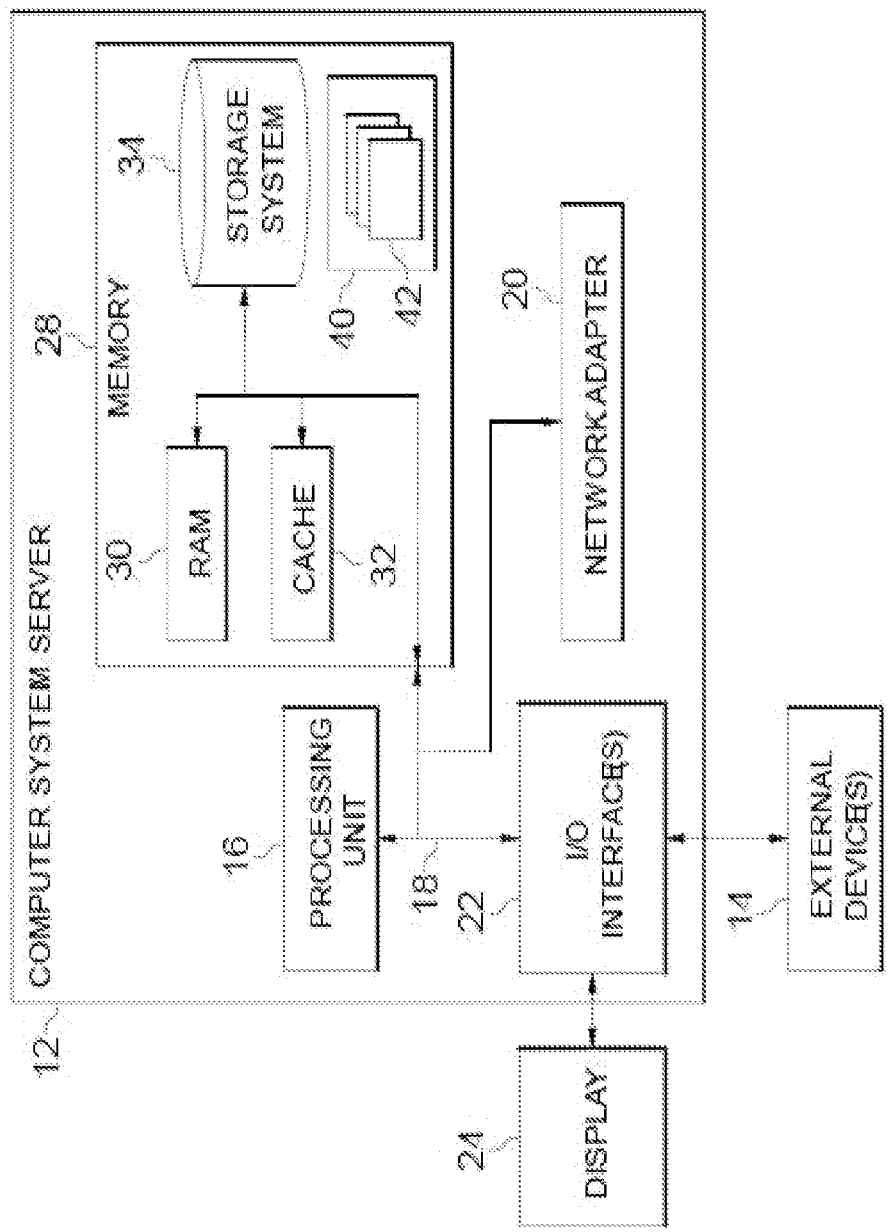
FIG. 1 depicts a cloud computing node according to an embodiment of the present invention.

Embodiments described herein are directed to performing a scan of a region of memory associated with a virtual machine (VM). In some embodiments, based on the scan of the memory region, a data structure is constructed that identifies indices of pages that are identical. In some embodiments, if no pages are the same, then the data structure indicates that with, for example, a value of 'null'.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model or distributed model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
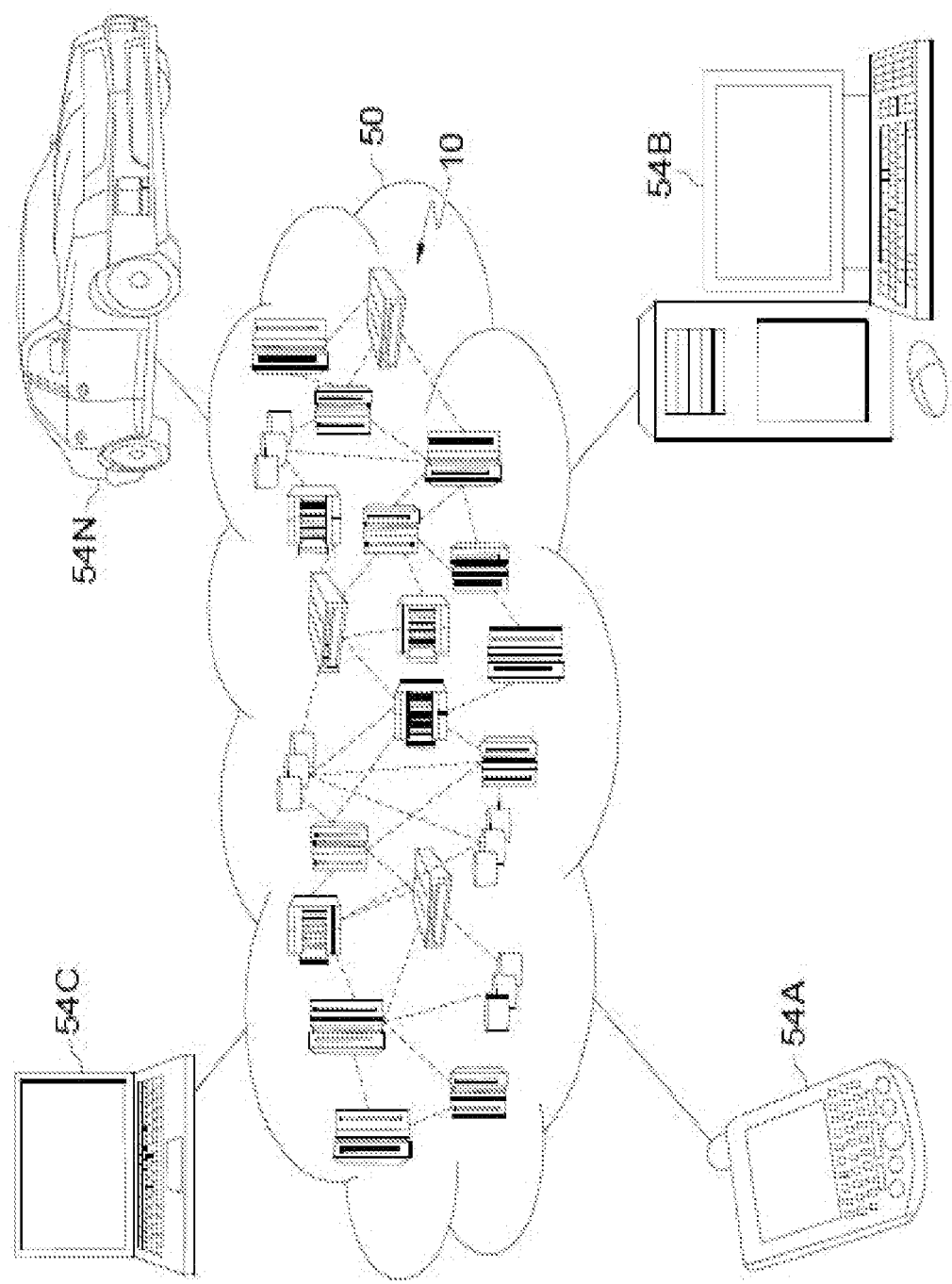
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
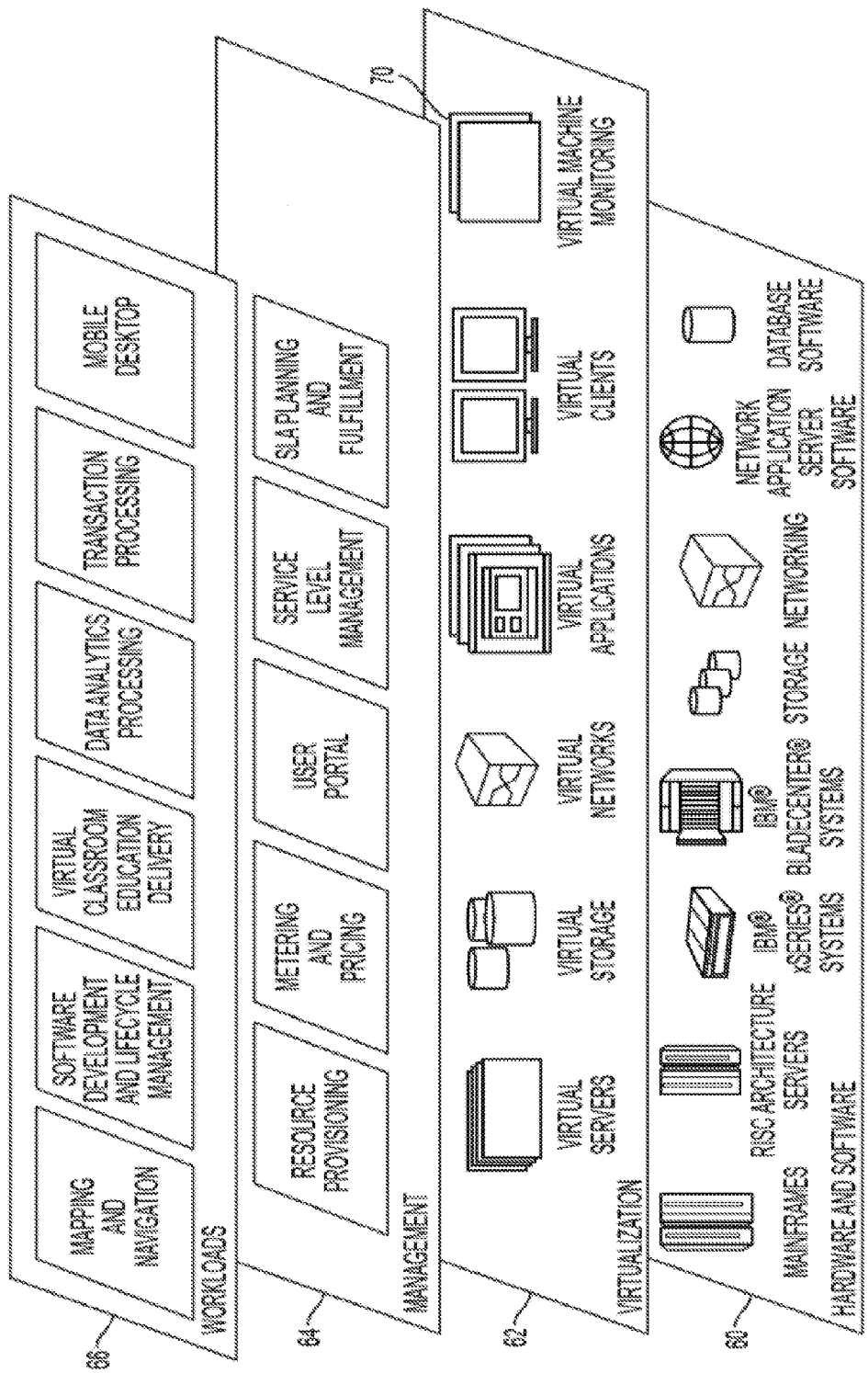
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as a virtual machine monitoring application 70 in the virtualization layer 62, may implement a process or method for scanning one or more memory regions associated with one or more virtual machines; however, it will be understood that the application 70 may be implemented in any layer.

In some instances, it is desirable to move data from a first location to a second location. For example, as part of a migration of a VM, data may be moved from, e.g., a first location (e.g., a first device or machine) to a second location (e.g., a second device or machine. A movement of data may be performed at runtime, potentially with or without an interruption of service.

In some embodiments, after the data is moved from the first location to the second location, the data at the first location is deleted or the first location is flagged as being free or clear for writing. Such treatment of the first location may be used to free memory or storage at the first location.

In some embodiments, after the data is moved from the first location to the second location the data at the first location is retained. Such treatment may be used to facilitate generating a copy of the data for purposes of, e.g., enhanced reliability or quality of service (QoS).

Figure 4:
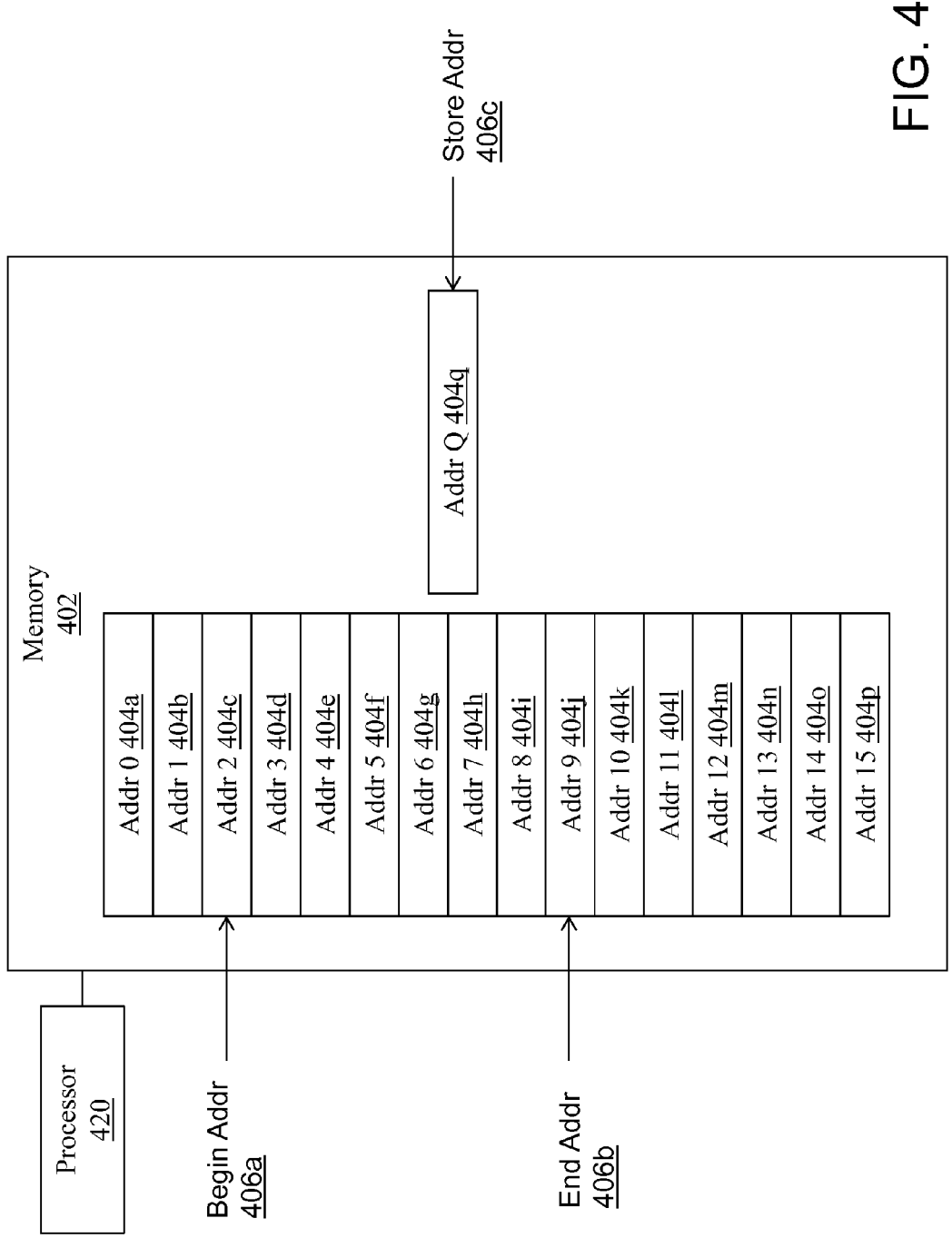
FIG. 4 illustrates exemplary memory locations in accordance with an embodiment.

Turning now to FIG. 4, a memory 402 is shown. In some embodiments, the memory 402 may correspond to the memory 28 of FIG. 1 (or a portion thereof). For purposes of illustrative simplicity, the memory 402 is shown as included sixteen addressable locations 404, numbered 0 through 15 (404a-404p). In some embodiments, the memory 402 includes more or less than sixteen locations 404. The locations 0-15 (404a-404p) may be contiguous or non-contiguous. In some embodiments, one or more of the locations 404 may correspond to a page.

In some embodiments, a scan of the memory 402 occurs. In some embodiments, the scan is performed by one or more devices or entities, such as the processing unit 16 of FIG. 1.

In some embodiments, the scan may be performed using a processor or processing unit that is separate or distinct from the processing unit 16 of FIG. 1. For example, as shown in FIG. 4, a processor 420 may perform the scan. The processor 420 may correspond to an offload processor, a general-purpose processor or GPU, etc.

In some embodiments the scan may be originated in a hypervisor operating system with full hardware addressing, or a hypervisor operating system using virtual hardware addressing, or by a userspace application using virtual addressing.

In some embodiments, the scan is used to identify substrings of data that repeat themselves in a region of the memory 402 that is of interest. The region of the memory 402 that is of interest may be identified using a beginning address and an ending address. In the illustrative example of FIG. 4, the beginning address 406a corresponds to address 2 404c and the ending address 406b corresponds to address 9 404j. The results of the scan may be written to a data structure, and the data structure may be stored to an identified memory address. In the illustrative example of FIG. 4, the data structure may be written to a storage or memory address 406c corresponding to an address or location 'Q' 404q.

In some embodiments, to facilitate the above operation, a scan function, process, routine, procedure, etc., may be implemented of the form:

scn beginaddr endaddr storeaddr, where scn is a scan call (e.g., a scan assembly call), beginaddr is the address at which the scan begins (e.g., 406a in FIG. 4), endaddr is the address at which the scan ends (e.g., 406b in FIG. 4), and storeaddr is the address where the resulting data structure is stored in memory (e.g., 406c in FIG. 4).

The above scan call may be generalized to accommodate the use of registers as an alternative to, or in addition to, the use of addresses (e.g., memory addresses). For example, "beginaddr" can optionally be replaced with "beginreg" to identify a register that contains the starting address to start a scan with. Similarly, "endaddr" can optionally be replaced with "endreg" to identify a register that contains the ending address to end a scan with. Similarly, "storeaddr" can optionally be replaced with "storereg" to identify a register whose location will be filled with the starting address of a data structure that includes results from having performed the scan. Thus, a scan may be performed using any combination of addresses and registers for the beginning, ending, and storage location parameters or arguments.

In some embodiments, a flag or register may be used to indicate that all of memory should be scanned. For example, depending on the context, all host memory may be scanned, such as in situations where a hypervisor is performing the scan, or the root user of a virtual machine, or a virtual machine operating system scanning all memory in that virtual machine. In some embodiments, a separate assembler may be called, for example, scana or alternatively using particular values for the arguments.

In some embodiments, the scn call includes one or more additional arguments. For example, the scn call may take the form:

scn beginreg endaddr storeaddr minlen, where the "minlen" argument represents a minimum length of a memory chunk whose replications are to be recorded. Specification of the "minlen" argument may be used to filter out short substrings that would not be of interest. Minlen may be expressed in some known units such as bytes, nibbles, words, bits, etc. For example, if the minlen is specified in bytes, setting minlen to one (1) may be used to filter out results of length less than one (1) byte from the resulting data structure.

The value for the argument "minlen" may be specified based on a particular application environment or context. In some embodiments, a scan is performed for various sized strings, sub strings, or chunks of memory. For example, a dynamic scan may be performed for various sized strings by changing or adjusting the "minlen" argument over multiple scn calls. In some embodiments, a particular value of minlen may be specified as an address or register that indicates the hardware is to perform dynamic scans without repeated calls to the scan assembler routine by the application.

Once beginning and ending locations are specified for a scan call, and the scan is performed, all substrings (or all substrings of at least "minlen" if such an argument is used) may be recorded or written to a storage location (e.g., memory address 'Q' 404q). In some embodiments, an identification or count of the number of instances or occurrences for each of the substrings is also recorded to the storage location in accordance with a known storage format.

Aspects of the disclosure may be applied in connection with metadata. For example, a register may have a value that is set to the length of the longest replicated string, an associated register may have a value that is set to the starting address of the replicated string, and a second associated register may contain the number of times the string has been replicated.

Figure 5:
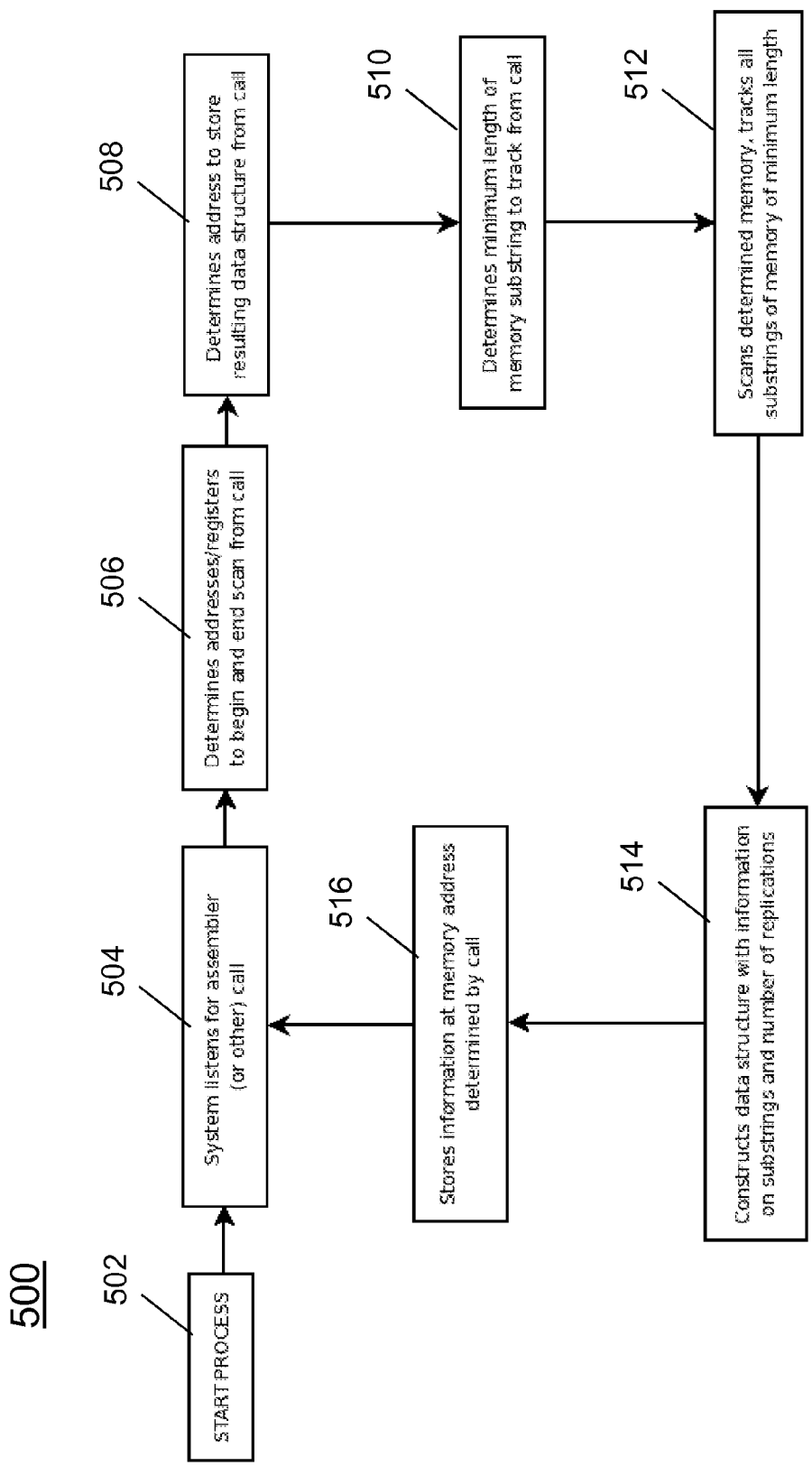
FIG. 5 illustrates a flow chart of an exemplary method in accordance with an embodiment.

Turning now to FIG. 5, a flow chart of an exemplary method 500 is shown. The method 500 may be executed in connection with one or more systems, components, or devices, such as those described herein. In some embodiments, the method 500 may be implemented by the application 70 of FIG. 3. The method 500 may be executed to collect metadata regarding information or data (e.g., substrings) stored in one or more memory devices.

In block 502, the method 500 may start. From block 502, flow may proceed to block 504.

In block 504, an entity (e.g., a system, an apparatus or device, etc.) may listen for a call, such as an assembler call. The call may correspond to an invocation of a scan routine, procedure, function, etc. From block 504, flow may proceed to block 506.

In block 506, a determination may be made regarding one or more addresses or registers to begin and end a scan. The addresses and/or registers may be specified as part of the call of block 504. From block 506, flow may proceed to block 508.

In block 508, a location (e.g., an address) may be determined or identified for purposes of storing a data structure that includes results from the call or running a scan. The location may be specified as part of the call of block 504. From block 508, flow may proceed to block 510.

In block 510, a minimum length of a substring to track may be determined or identified. The minimum length may be specified as part of the call of block 504. From block 510, flow may proceed to block 512.

In block 512, a scan of memory may be performed based on the addresses and/or registers associated with block 506. Some or all substrings may be tracked. For example, substrings that are greater than or equal to a minimum length (block 510) may be tracked. A number of replications or occurrences of each substring that is tracked may also be tracked or recorded. From block 512, flow may proceed to block 514.

In block 514, a data structure may be constructed. The constructed data structure may include information on the substrings that were tracked and the number of replications or occurrences (block 512). This data structure may be located in a region of system memory, placed in vector pairs/sets of registers, or placed in some special purpose storage (volatile or nonvolatile). From block 514, flow may proceed to block 516.

In block 516, the information or the data structure constructed as part of block 514 may be stored at the location determined/identified in block 508. From block 516, flow may proceed to block 504. The flow from block 516 to block 504 may establish a loop, such that once a first call or scan is performed or processed, subsequent calls or scans may be performed and processed.

The blocks or operations of the method 500 are illustrative. In some embodiments, one or more of the blocks (or a portion thereof) is optional. In some embodiments, one or more blocks execute in an order or sequence different from what is shown in FIG. 5 (e.g., blocks 506, 508, and 510 could execute in any order). In some embodiments, one or more additional blocks not shown are included.

In some embodiments a machine may determine what data is available at the machine by performing a scan. The scan may be performed by a hypervisor or virtual machine manager (VMM). The scan may be performed on memory, e.g., all or a portion of the memory, or virtual memory referenced by one or more VMs. The VMs may be located on, or hosted by, the machine. The machine may transmit or broadcast information relating to the data that is available. The data may pertain to strings, substrings, pages of memory, metadata, etc.

In some embodiments, a hardware entity may be configured to quickly scan a contiguous or non-contiguous memory region that includes one or more contiguous fixed size regions of memory. A data structure (e.g., a map, table, or chained linked list (optionally sorted)) may be constructed of page indices which are identical or may indicate or include a 'null' if no pages are the same. For example, a table may be configured such that if a contiguous known fixed length memory region's index is entered, a linked list of all other memory region indices, which contain identical contents at that address, may be provided (or a 'null' may be provided if no pages are the same).

In some embodiments, offsets or lengths may be used within a page or contiguous page regions to facilitate partial same-page replication detection. In some embodiments, a location of an optimal size region for memory sharing may be determined by iterating over all pages multiple times (e.g., multiple times per second), adjusting an index into the page by a single byte, and adjusting the length by a single byte, until all indices within a page and all region sizes within a page are computed. In some embodiments, scans may be performed in parallel to improve or enhance efficiency. The average size (e.g., mean, median, mode, and standard deviation, or any combination of the above) of chained items in a data structure (e.g., a map, table, or linked list) may be stored to obtain a sense for the distribution of same-page values. In some embodiments, the results of such a computation may be placed in a register, facilitating fast access to the results. In some embodiments, an operating system or other software may access the results.

In some embodiments, direct data or (sub)string comparisons may be performed to determine or identify instances or occurrences of data. Such information may be used to migrate a VM from a first machine to one or more additional machines. Hardware based scans may be performed to increase the speed at which a machine or VM's memory environment is characterized. Fast characterization may be needed in environments associated with large amounts of data, such as data centers, server applications, etc.

In some embodiments, VMs may point to or reference a shared memory such that data transfer or data replication operations may be reduced or minimized. Furthermore, resources (e.g., storage resources) may be preserved such that the number of VMs hosted on a single machine may be increased or maximized.

In some embodiments, one or more data structures may be implemented using rabin fingerprinting. Rabin fingerprinting may be used in some embodiments, potentially in lieu of using a hash table or hash table based protocol or in lieu of a perfect bit matching to enable speedups.

In some embodiments, entries may be invalidated when a guest is writing to referenced memory regions. Computed values may be correct for only a point in time, but may be invalidated seconds later under heavy dynamic memory workloads.

Technical effects and benefits include a storage of indices associated with shared memory regions. By keeping a data structure of indices, as opposed to storing or sharing entire memory pages, overhead may be reduced and performance may be increased or enhanced. The indices or metadata may be used to migrate between machines or facilitate generating copies of data between machines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, assembler or millicode/microcode on an embedded or special purpose processor may be used to implement one or more aspects of this disclosure.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    performing a scan of a contiguous memory region associated with a virtual machine, the performing by a hardware mechanism in response to a call, wherein the scan comprises identifying substrings during the scan based on determining that each of the identified substrings is of a length that is greater than a threshold specified by the call;
    constructing, by the hardware mechanism, a data structure comprising information about the substrings identified during the scan and a number of replications in the contiguous memory region of each of the identified substrings; and
    storing, by the hardware mechanism, the data structure at a location determined by the call;

wherein performing the scan further comprises:
    locating a region for memory sharing by performing a plurality of iterations of scanning over a plurality of contiguous pages comprising the contiguous memory region wherein, for each iteration, an index into a page is incremented by a single byte, and the minimum length is incremented by a single byte, until all indices within the page and all region sizes within the page are computed, wherein the plurality of iterations are performed in parallel, and
    storing an indication of the region for memory sharing in a register, wherein the indication of the region is used to migrate the virtual machine from a first hardware platform to a second hardware platform that is distinct from the first hardware platform.

2. The method of claim 1, further comprising:
determining, by the hardware mechanism, at least one of a beginning address and a beginning register to start the scan from based on the call;
determining, by the hardware mechanism, at least one of an ending address and an ending register to end the scan based on the call; and
performing, by the hardware mechanism, the scan based on the at least one of a beginning address and a beginning register and the at least one of an ending address and an ending register.

3. The method of claim 1, wherein the data structure is stored using rabin fingerprinting.

4. The method of claim 1, wherein the data structure is stored using hashing.

5. The method of claim 1, wherein the data structure is stored at a memory address determined by the call.

6. The method of claim 1, wherein the contiguous memory region is referenced by a plurality of virtual machines, the plurality of virtual machines including the virtual machine, and wherein the plurality of virtual machines are hosted by the first hardware platform.

7. The method of claim 1, further comprising
    sorting the information based on the number of replications for each substring,
    wherein the data structure is stored based on the sorting.

8. The method of claim 1, wherein the data structure comprises a plurality of memory region indices, wherein each of the plurality of memory region indices stores a same identified substring.

9. The method of claim 8, further comprising, based on receiving a memory region index corresponding to any one of the plurality of memory region indices, returning a linked list of the plurality of memory region indices.

10. The method of claim 1, further comprising determining and storing an average size of chained items in the data structure, wherein the chained items in the data structure are of varying sizes.

11. The method of claim 1, wherein the contiguous memory region is located in a system memory of a computer server.

* * * * *